(12) United States Patent
Duller et al.

(10) Patent No.: US 9,104,426 B2
(45) Date of Patent: Aug. 11, 2015

(54) PROCESSOR ARCHITECTURE FOR PROCESSING VARIABLE LENGTH INSTRUCTION WORDS

(75) Inventors: Andrew Duller, Bristol (GB); Gajinder Singh Panesar, Bristol (GB); Peter Claydon, Bath (GB); William Robbins, Bristol (GB); Andrew Kuligowski, Bath (GB); Olfat Younis, Bath (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/981,973

(22) Filed: Nov. 1, 2007

(65) Prior Publication Data

US 2008/0065859 A1 Mar. 13, 2008

Related U.S. Application Data

(63) Continuation of application No. 11/293,845, filed on Dec. 2, 2005, now abandoned.

(30) Foreign Application Priority Data

Dec. 3, 2004 (GB) .................................. 0426606.0

(51) Int. Cl.
*G06F 7/38* (2006.01)
*G06F 9/38* (2006.01)
*G06F 9/30* (2006.01)

(52) U.S. Cl.
CPC .......... *G06F 9/3885* (2013.01); *G06F 9/30149* (2013.01); *G06F 9/3853* (2013.01); *G06F 9/3891* (2013.01)

(58) Field of Classification Search
CPC .............................. G06F 9/3015; G06F 9/3816
USPC ............. 712/204, 226, 234, 235, 24, 245, 12, 712/17, 18, 200, 205, 206, 209, 213, 215, 712/216, 237; 700/2; 711/104
See application file for complete search history.

(56) References Cited

U.S. PATENT DOCUMENTS 5,692,139 A 11/1997 Slavenburg et al.
5,826,054 A * 10/1998 Jacobs et al. .................. 712/213

(Continued)

FOREIGN PATENT DOCUMENTS

JP 2001-034471 A 2/2001
JP 2004-525439 A 8/2004

(Continued)

OTHER PUBLICATIONS

MIPS, MIPS32 Architecture for Programmers, 2001, MIPS Technologies, vol. 2, pp. 1-253.*

(Continued)

*Primary Examiner* — Titus Wong
(74) *Attorney, Agent, or Firm* — Vecchia Patent Agent, LLC (57) ABSTRACT

A LIW processor comprises multiple execution units. The multiple execution units of the processor are divided into groups, and an input instruction word can contain instructions for one execution unit in each of the groups. The processor is optimized for use in signal processing operations, in that the multiple execution units of the processor are divided into groups which do not place significant restrictions on the desirable uses of the processor, because it has been determined that, in signal processing applications, it is not usually necessary for certain execution units to operate simultaneously. These execution units can therefore be grouped together, in such a way that only one of them can operate at a particular time, without significantly impacting on the operation of the device. An array is formed from multiple interconnected processors of this type.

18 Claims, 5 Drawing Sheets

(56) References Cited

U.S. PATENT DOCUMENTS

| | | | |
|---|---|---|---|
| 5,848,288 A | 12/1998 | O'Connor | |
| 6,023,757 A * | 2/2000 | Nishimoto et al. | 712/209 |
| 6,044,451 A | 3/2000 | Slavenburg et al. | |
| 6,240,510 B1 | 5/2001 | Yeh et al. | |
| 6,317,820 B1 * | 11/2001 | Shiell et al. | 712/32 |
| 6,499,096 B1 * | 12/2002 | Suzuki | 712/24 |
| 6,499,097 B2 * | 12/2002 | Tremblay et al. | 712/204 |
| 6,615,339 B1 * | 9/2003 | Ito et al. | 712/24 |
| 6,631,439 B2 * | 10/2003 | Saulsbury et al. | 711/104 |
| 6,775,766 B2 * | 8/2004 | Revilla et al. | 712/245 |
| 6,892,293 B2 * | 5/2005 | Sachs et al. | 712/215 |
| 7,302,552 B2 * | 11/2007 | Guffens et al. | 712/204 |
| 7,383,422 B2 * | 6/2008 | Kageyama et al. | 712/24 |
| 7,818,547 B2 | 10/2010 | Aamodt et al. | |
| 7,840,953 B2 | 11/2010 | Wu et al. | |
| 2002/0069345 A1 * | 6/2002 | Mohamed et al. | 712/215 |
| 2002/0198606 A1 | 12/2002 | Satou | |
| 2003/0154358 A1 | 8/2003 | Seong | |

FOREIGN PATENT DOCUMENTS

| | | |
|---|---|---|
| JP | 2006-500673 A | 1/2006 |
| WO | WO 02/50624 A2 | 6/2002 |
| WO | WO 2004/029796 A2 | 4/2004 |
| WO | WO 2004/034251 A | 4/2004 |

OTHER PUBLICATIONS

Pechanek et al. ManArray Processor Interconnection Network: An Introduction, Euro-Par'99, LNCS 1685, pp. 761-765, 1999.

European Search Report for Apl'n EP 05 257 447.2 dated Apr. 12, 2007.

Final Office Action mailed Dec. 6, 2011 in connection with Japanese Patent Application No. 2005-349339.

* cited by examiner

| | Byte 0 | | | Byte 1 | | Extension byte | | |
|---|---|---|---|---|---|---|---|---|
| Field size (bits) | 3 | 1 | 4 | 4 | 4 | 2 | 4 | 2 |
| No ALU #0 op, with LIW | 000 | Lcode2 | Lcode3 | | | | | |
| 3 op ALU #0 short, no LIW | 001–100 | 0 | operand | operand | operand | | | |
| Load short, no LIW | 101–110 | 0 | operand | operand | operand | | | |
| 0/1/2 op ALU #0, no LIW | 111 | 0 | opcode | Operand (optional) | Operand (optional) | | | |
| 3 op ALU #0, possible LIW | 001–110 | 1 | operand | operand | operand | ex op | S | Lcode2 Lcode3 |
| 1/2 op ALU #0, with LIW | 111 | 1 | opcode | operand | operand | 00 | S | Lcode2 Lcode3 |

Fig. 4

| Execution Unit / Operation | Lcode2 | Additional bytes |
|---|---|---|
| No Comms / MAU operation | 000 | None |
| Put | 001 | 1 byte defining register pair to source data and communications port reference |
| Get | 010 | 1 byte defining register pair to receive data and communications port reference |
| Put and Get | 011 | 1 byte defining register pair to source/receive data and communications port reference |
| MAU Memory access (short) | 100 | 1 byte; 4-bit opcode to define Load/Store operation and 4-bit register address |
| MAU Memory access (long) | 101 | 2 bytes; 4-bit opcode to define Load/Store operation, 4-bit or 8-bit offset value, one or two 4-bit register addresses |
| MAU ALU operation | 110 | 2 bytes; 4-bit opcode, up to three 4-bit register addresses for operands |
| Reserved | 111 | None |

Fig. 5

| Execution Unit / Operation | Lcode3 | Additional bytes |
|---|---|---|
| No Branch, MAC or ASU operation | 00 | None |
| Branch | 01 | 1 or 2 bytes carrying additional opcode definition, register addresses or offsets |
| ASU operation | 10 | 2 bytes to carry 2-bit opcode, register addresses and constant values |
| MAC operation | 11 | 2 or 3 bytes carrying accumulate and format controls, operand register addresses and constant values |

Fig. 6

| Operand value | Action |
|---|---|
| X (where X ≠ 15) | Access register X |
| 15 | Retrieve Long Constant or Discard operation result |

Fig. 7

Word boundary

Figure 8

PROCESSOR ARCHITECTURE FOR PROCESSING VARIABLE LENGTH INSTRUCTION WORDS

This application is a continuation of and claims priority from U.S. patent application Ser. No. 11/293,845 filed Dec. 2, 2005 now abandoned which claims priority from British Patent Application No. 0426606.0 filed on Dec. 3, 2004, the subject matter of these applications are herein incorporated by reference in their entirety.

BACKGROUND

This invention relates to a processor architecture, and in particular to a processor architecture which is particularly useful in signal processing applications.

Modern high-performance wireless communications systems require digital processors which can provide billions of compute operations per second to achieve acceptable performance, for example to carry out operations such as filtering, equalisation and decoding functions. Increasingly these very high processing demands are satisfied by the use of multiple execution units (such as arithmetic logic units (ALUs), multipliers, address generators etc.) which can operate in parallel within a single processor cycle, and can thus increase the aggregate number of operations which can be completed per cycle.

One architectural approach which has been developed, in order to allow parallel operation of multiple execution units, is the Long Instruction Word (LIW) architecture. In this approach, instructions for each of a number of execution units are concatenated into one "long instruction word" which can be executed in a single processor cycle. Typically, in implementations of this approach, a bit field within the long instruction is reserved for an instruction for each of the execution units, regardless of whether a particular execution unit will be active within any one processor cycle. This has the disadvantageous effect that it creates excessively long instruction words, which can contain a lot of redundant information for execution units that are not active. The end result is a larger and more costly design.

SUMMARY OF THE INVENTION

The present invention relates to an alternative implementation of an LIW processor.

According to a preferred embodiment of the present invention, there is provided a processor which comprises multiple execution units. The multiple execution units of the processor are divided into groups, and an input instruction word can contain instructions for one execution unit in each of the groups.

In a further preferred embodiment of the invention, the processor is optimised for use in signal processing operations, in that the multiple execution units of the processor are divided into groups which do not place significant restrictions on the desirable uses of the processor. That is, it has been determined that, in signal processing applications, it is not usually necessary for certain execution units to operate simultaneously.

These execution units can therefore be grouped together, in such a way that only one of them can operate at a particular time, without significantly impacting on the operation of the device.

According to a further aspect of the present invention, there is provided an array, comprising a plurality of interconnected processors, wherein each of the processors comprises multiple execution units as defined above.

BRIEF DESCRIPTION OF THE DRAWINGS

For a better understanding of the present invention, and to show how it may be put into effect, reference will now be made to the accompanying drawings, in which.

DETAILED DESCRIPTION

Figure 1:
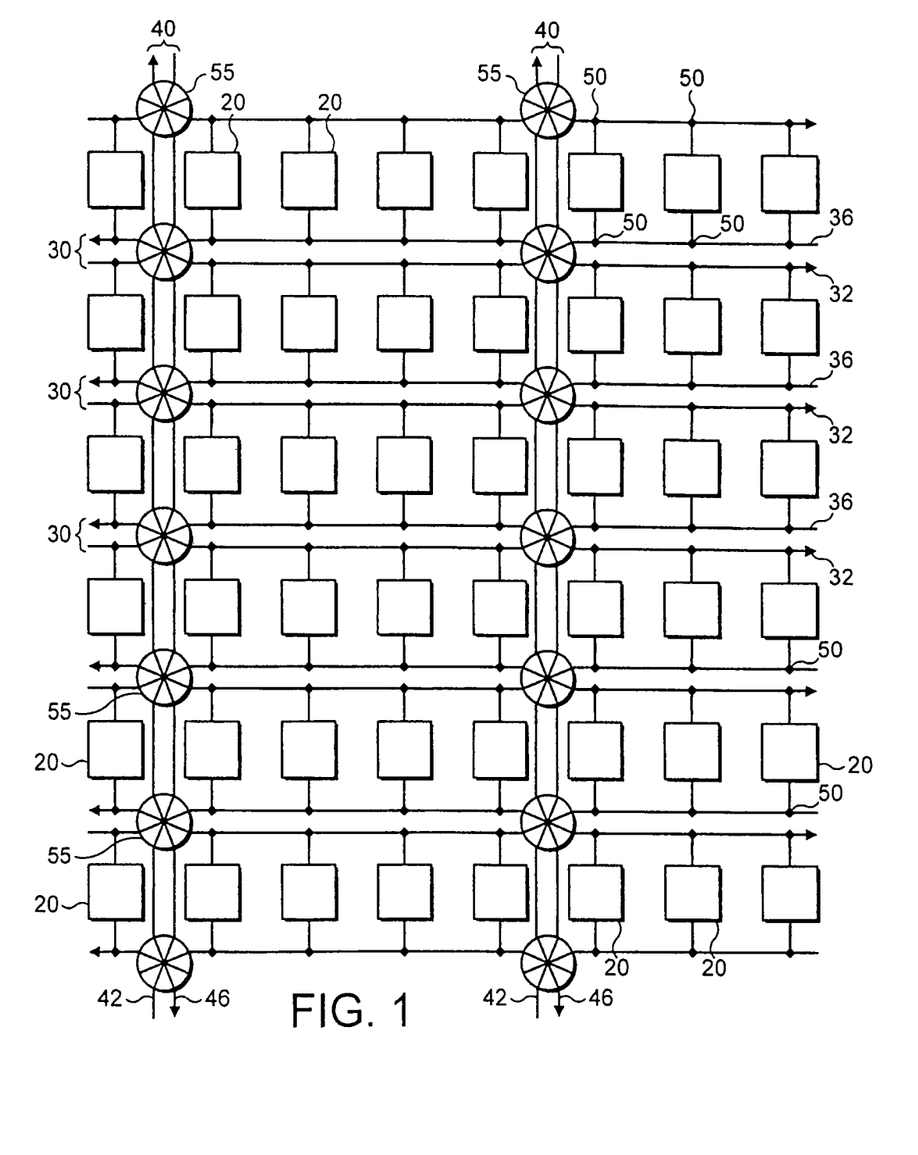
FIG. 1 is a block schematic diagram of a processor array according to an aspect of the present invention.

FIG. 1 is a block schematic diagram of a processor array, as generally described in WO02/50624. The array is made up of array elements 20, which are interconnected by buses and switches.

The array architecture includes first bus pairs 30, shown running horizontally in FIG. 1, each pair including a respective first bus 32 carrying data from left to right in FIG. 1 and a respective second bus 36 carrying data from right to left.

The array architecture includes second bus pairs 40, shown running vertically in FIG. 1, each pair including a respective third bus 42 carrying data upwards in FIG. 1 and a respective fourth bus 46 carrying data downwards.

In FIG. 1, each diamond connection 50 represents a switch, which connects an array element 20 to a respective bus 32, 36. The array further includes a switch matrix 55 at each intersection of a first and second bus pair 30, 40. The data buses, and the switches and switch matrices, therefore allow data to be switched from one array element to another for processing, as required.

Figure 2:
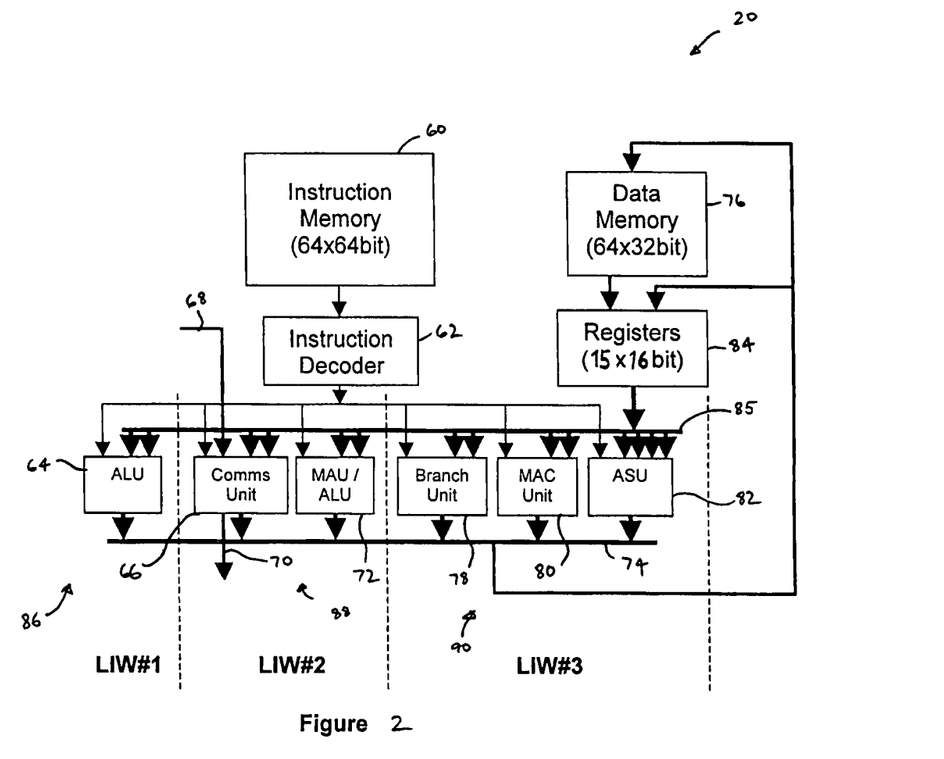
FIG. 2 is a block schematic diagram of a processor within the processor array of FIG. 1, according to another aspect of the present invention.

In this embodiment of the invention, at least some of the array elements 20 take the form of processors, as shown in more detail in FIG. 2. In accordance with this illustrated embodiment of the present invention, the processors 20 are adapted to make them particularly suitable for use as array elements, although the invention is also applicable to individual processors.

The processor 20 includes a 64×64 bit instruction memory 60, which contains instructions loaded into the memory to control the operation of the processor. In operation of the device, instructions are fetched from the instruction memory 60, and passed to an instruction decoder 62, where they are decoded to configure the datapaths and execution units in the processor.

In this illustrated embodiment, the processor comprises six execution units. The first available execution unit is a first Arithmetic Logic Unit (ALU) 64, which can perform a number of arithmetic and logical operations.

The second available execution unit is a communications unit 66, which is connected to the input communications bus 68 and the output communications bus 70, and is able to perform "put" and "get" operations to move data to and from the external communications buses 68, 70, and is also able to move data to and from the 15×16 bit data registers 84. The registers 84 are connected to the execution units by means of a data bus 85.

In this illustrated embodiment, the communications unit 66 is thereby optimised to support the processing performed in the array, whereby data flows from one processor 20 to another, with parts of the processing being performed at each stage.

The third available execution unit is a combined Memory Access Unit (MAU)/second ALU 72, which performs a variety of load and store operations over a bus 74 to a 64×32 bit data memory 76, and also provides a subset of the ALU operations performed by the first ALU 64.

The fourth available execution unit is a branch unit 78, which performs a number of conditional and unconditional branch operations.

The fifth available execution unit is a Multiplier Accumulator (MAC) Unit 80, which performs a variety of multiply and multiply accumulate operations with various bit widths. In an alternative embodiment of the invention, this unit may be replaced by a simpler Multiply unit.

In this illustrated embodiment of the invention, there is a sixth available execution unit in the form of an Application Specific Unit (ASU) 82. More specifically, the ASU 82 is adapted to perform a number of highly specialised operations for wireless signal processing applications, such as complex spread and complex despread, in order to support CDMA transmit and receive functionality. In an alternative embodiment of the invention, this unit may be omitted.

As is conventional, in general each execution unit is able to perform one operation in one clock cycle. However, The first ALU 64 is also able to perform a shift operation on the first operand of the basic arithmetic or logical operations. Thus, in this special case, two instructions can effectively execute simultaneously on that one execution unit.

Analysis of a wide range of signal processing applications has now led to the conclusion that it is not necessary for all of the execution units to be able to operate simultaneously. In this illustrated embodiment of the invention, the execution units are clustered into three groups, each controlled by a separate instruction in a LIW instruction.

Specifically, in this illustrated embodiment, the first group 86 includes only the first Arithmetic Logic Unit (ALU) 64; the second group 88 is made up of the communications unit 66, and the combined Memory Access Unit (MAU)/second ALU 72; and the third group 90 is made up the branch unit 78, the Multiplier Accumulator (MAC) Unit 80, and the Application Specific Unit (ASU) 82.

According to this preferred embodiment of the invention, the device is then controlled such that any one, any two, or all three of the groups 86, 88, 90 can be active at any one time, but such that no more than one of the execution units within a group can be active at any one time. Further, the instruction format is such that this can be achieved efficiently in each case.

Specifically, a long instruction word can include an instruction LIW#1 for the first group 86, an instruction LIW#2 for the second group 88, and an instruction LIW#3 for the third group 90.

Figure 3:
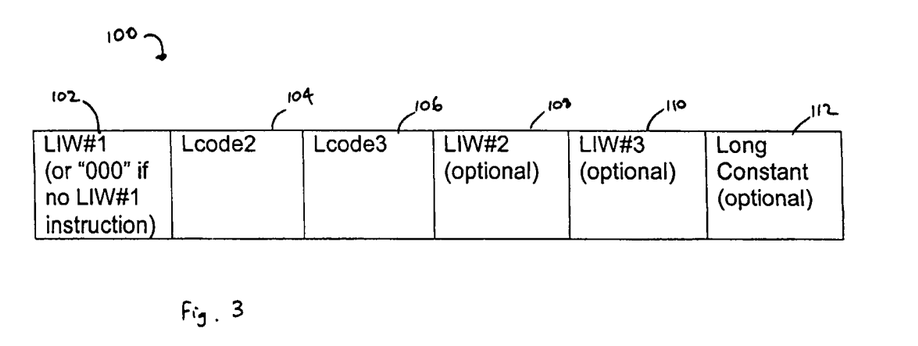
FIG. 3 is an overview of the format of an instruction word for use in the processor of FIG. 2.
Figure 4:
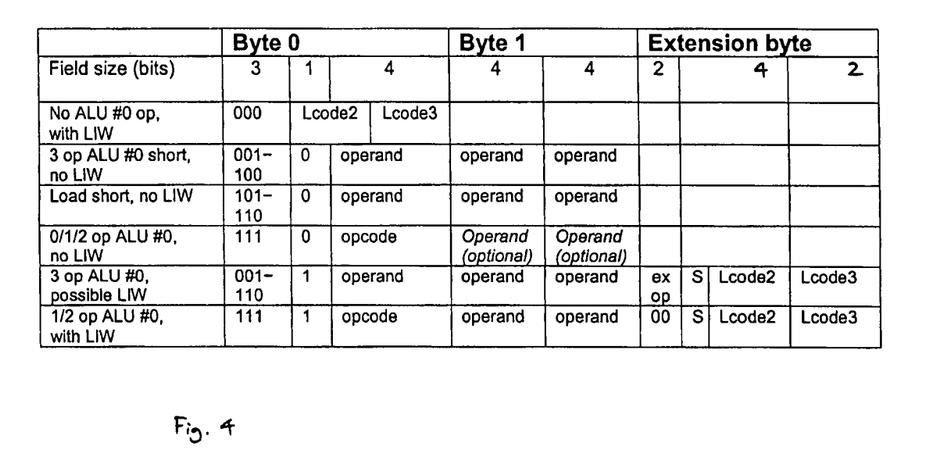
FIG. 4 illustrates in more detail the format of a part of the instruction word shown in FIG. 3.
Figure 5:
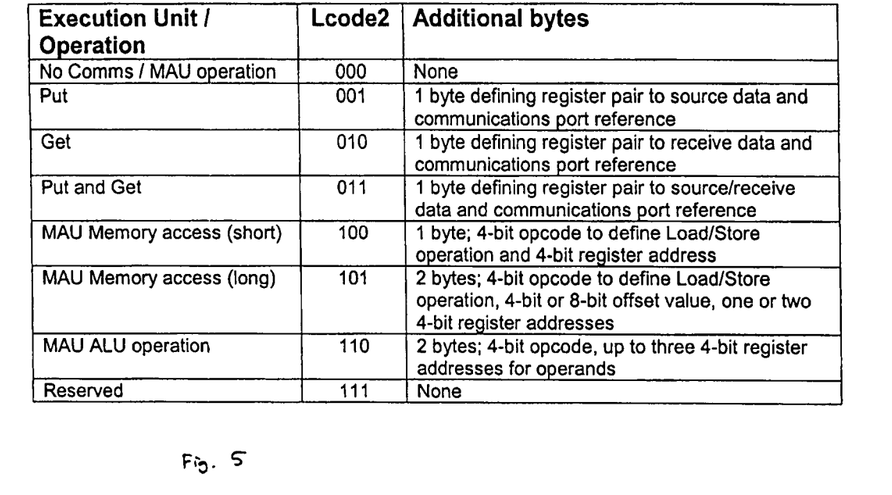
FIG. 5 illustrates the operation of a second part of the instruction word shown in FIG. 3.
Figure 6:
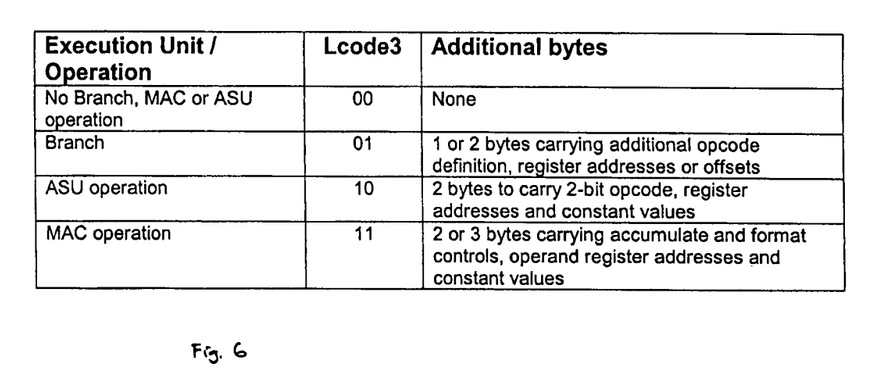
FIG. 6 illustrates the operation of a third part of the instruction word shown in FIG. 3.

FIG. 3 shows the basic structure of a long instruction word instruction, which is also explained in more detail in FIGS. 4, 5 and 6.

Thus, the long instruction word first contains a short, 3 bit, bit sequence, which indicates whether the first group 86 is active in that processor cycle and, if so, indicates what class of operation is to be performed, so that execution units and datapaths can be configured.

As shown in FIG. 4, except in the case where the first three bits of byte 0 are 000, the first group 86 is active in that processor cycle and that three bit sequence indicates what operation is to be performed by the first Arithmetic Logic Unit (ALU) 64.

Thus, when the value of the first three bits is within the range 001-100, the operation is an ALU operation with three operands, for example adding two values to give a result, with the three operands then being the register addresses of the two values to be added plus the register address in which the result is to be stored.

When the value of the first three bits is within the range 101-110, the operation is a load or store operation between the data memory and a nominated register or register pair.

When the value of the first three bits is 111, the operation is an ALU operation with two operands, one operand, or no operands, for example nop.

In any of these cases, the fourth bit then indicates whether an extension byte is to be used, as will be described in more detail below. The remaining four bits of byte 0, and the eight bits of byte 1, then indicate the operands or opcode values, depending on the value of the first three bits of byte 0, as shown in FIG. 4. More specifically, where FIG. 4 says that four of these bits represent an operand, they define the address, within the registers 84, from which the first ALU 64 should retrieve the respective operand on which it will perform the defined operation.

When the first three bits of byte 0 are not 000, and thus the first group 86 is active in that processor cycle, the fourth bit must be set to "1", and the extension byte must be used, if either the second group 88 or the third group 90 is active.

In the case where the first three bits of byte 0 are 000, the first group 86 is not active in that processor cycle, and byte 0 of the long instruction word then contains further short bit sequences, which indicate whether the second group 88 and third group 90 are active and, if so, what class of operation is to be performed.

Thus, there is a 3 bit sequence Lcode 2 relating to the second group 88, as shown in FIG. 5, and a 2 bit sequence Lcode 3 relating to the second group 90, as shown in FIG. 6.

If either or both of the second group 88 and third group 90 is active, then additional bytes LIW#2 108 provide required information to allow the second group 88 to perform the intended function, and additional bytes LIW#3 110 provide required information to allow the third group 90 to perform the intended function.

In the case where the first three bits of byte 0 are not 000, and an LIW#1 instruction or "short" Memory Access operation is to be executed, the extension byte must be used if either or both of the second group 88 and third group 90 is active. If so, the extension byte carries Lcode2 and Lcode3, and additional bytes LIW#2 108 and LIW#3 110 contain the required information to allow the relevant group to perform the intended function.

The extension byte also carries a 2-bit extension opcode "ex op", which allows more possible instructions for ALU#0. The extension byte also includes a 1 bit flag, S. If set, the flag S indicates the presence of a shift operation on the ALU first operand. In that case, an additional byte following the extension byte is used to define whether the shift is logical or arithmetic, to the left or right, and how many bits are shifted (4-bit value).

Figure 7:
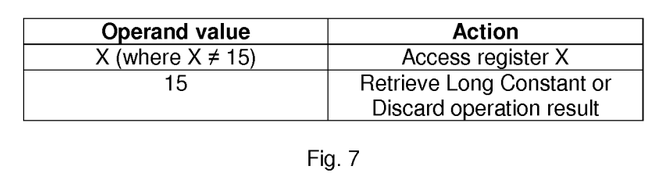
FIG. 7 illustrates operand values and actions.

The instruction set architecture supports the use of short constants (which, in this illustrated embodiment, are 4 bits long) and long constants (which, in this illustrated embodiment, are 16 bits long). As shown in FIG. 4, operands are generally 4 bits long, and one of these 4-bit operands normally refers to one of the registers 84, but it can alternatively be used to indicate a 4-bit constant value. As illustrated in FIG. 7, where it is required to use a longer constant value, the operand value '15' is used to direct the instruction decoder 62 to take the value in the 16-bit field 112, which in that case appears at the end of the long instruction word instruction, as a 16-bit constant value. No useful information is therefore stored at the register address "15" (RI 5). Thus, writing to R15 is used to indicate that an operation result should be discarded.

It can therefore be seen that the encoded instruction word is organized on byte boundaries. It can further be seen from FIGS. 3-6 that an individual LIW instruction can be between 1 byte (the special case where none of the groups is active, and there are no LIW#1, no LIW#2 and no LIW#3 instructions) and 9 bytes in length. The instruction decoder 62 can therefore support any combination of instruction lengths within a single 64-bit instruction word and can tolerate LIW instructions which are contained in successive 64-bit instruction words.

In one embodiment of the invention, the length of any single LIW instruction cannot exceed 8 bytes. However, in other embodiments of the invention, this maximum length can be set to any desired value. This restriction results in a small number of combinations of LIW#1, LIW#2 and LIW#3 instructions which cannot be supported because they exceed this length. These illegal combinations are trapped by the Instruction Decode block 62, resulting in the setting of an Illegal Instruction flag. Preferably, a compiler and assembler operating to support the processor architecture should also intercept disallowed instruction combinations at compile time.

Figure 8:
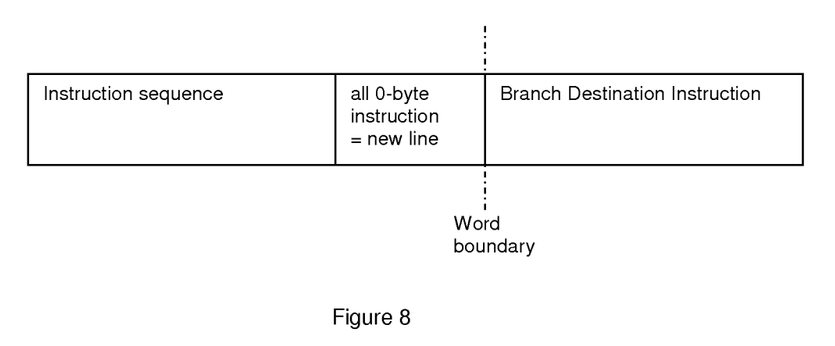
FIG. 8 illustrates a branch destination instruction at a word boundary.

There is one situation where alignment of LIW instructions must be restricted further, and that is in the case of branch destinations. The architecture relies on an instruction being decoded every processor cycle and therefore it is necessary that a branch destination is aligned at the beginning of a 64-bit instruction word. The instruction decoder 62 interprets an all-0 byte instruction (equivalent to "no LIW#1, no LIW#2, no LIW#3") as a "new line" and will fetch the next 64-bit instruction word. Thus the compiler and assembler can use the "new line" instruction at the end of an instruction sequence immediately prior to a branch destination, as illustrated in FIG. 8, in order to ensure 64-bit alignment of the instruction at the branch destination.

The long instruction word format therefore has the property that the length $LIW_{inst}$ of the long instruction word is independent of the total number of execution units. Rather, it is determined by the maximum number of execution units which can be active in a single processor cycle. In the illustrated embodiment, a maximum of three execution units out of the six available can be active in a single LIW instruction/processor cycle, and the maximum length of a single LIW instruction is limited to 64 bits.

Further, the length $LIW_{inst}$ of the long instruction word can vary, from one instruction to the next, depending on the number of active execution units within a given cycle. Thus, in many instruction cycles, it is likely that $LIW_{inst}$ will be less than 64 bits.

Also, multiple instructions can be packed into the 64 bit wide instruction memory 60, usually without the need for alignment to word boundaries, and the instructions can overrun a 64-bit instruction word boundary into the following instruction word.

Taken together, these factors mean that the result is object code which is compact and highly efficient in both high-throughput signal processing applications with multiple parallel operations per cycle and lower-throughput, more complex control operations.

This reduces hardware complexity significantly and, more importantly, reduces the complexity of the compiler/assembler required to support the architecture.

The invention claimed is:

1. A processor comprising:
a plurality of registers to store data;
an instruction decoder to decode a first instruction word that is to include a first plurality of at least three instructions, wherein the first instruction word is part of an instruction set architecture having instruction words with a variable instruction length; and
at least three groups of execution units coupled with the instruction decoder and the plurality of registers,
wherein each of the at least three groups of execution units is to correspond to a different instruction of the at least three instructions of the first instruction word,
wherein each instruction of the at least three instructions of the first instruction word is only able to control an execution unit in the corresponding group of execution units, and
wherein only one execution unit in each of the at least three groups of execution units is to be controlled by the different corresponding instructions of the at least three instructions of the first instruction word.

2. The processor of claim 1, wherein each instruction is capable of controlling any of the execution units in each corresponding group of execution units.

3. The processor of claim 1, wherein the instruction words of the instruction set architecture have instruction lengths that depend on a number of execution units to be controlled by the instruction words but not on a total number of execution units.

4. The processor of claim 1, wherein the instruction decoder is to decode a second instruction word that is to include a second plurality of instructions, wherein the second instruction word is shorter than the first instruction word, and wherein the second plurality of instructions is less than the first plurality of instructions.

5. The processor of claim 4, wherein the second instruction word is able to control only one execution unit in less than all of the groups of the execution units, but in any of the groups of the execution units.

6. The processor of claim 1, wherein the instruction decoder is to decode a second instruction word that is to control an execution unit in one of only any one, only any two, and in all of the groups of execution units.

7. The processor of claim 1, wherein the instruction decoder is to decode the first instruction word that is to have a first bit sequence, wherein a plurality of values of the first bit sequence are each to provide an address of a register that is to have an operand on which an operation of the first instruction word is to be performed, and wherein a given value of the first bit sequence is to direct the instruction decoder to take a value in a field of the first instruction word which is different than the first bit sequence.

8. The processor of claim 7, wherein the first bit sequence comprises four bits.

9. The processor of claim 7, wherein the field has a greater number of bits than the first bit sequence.

10. The processor of claim 1, wherein the instruction decoder is to decode a second instruction word that is to include a given bit sequence to indicate that the second instruction word has no instructions, and wherein the processor in response to the second instruction word is to fetch a next instruction word.

11. The processor of claim 10, wherein the next instruction word is to include a branch destination.

12. The processor of claim 1, wherein a group of execution units includes execution units selected based on analysis of operation of the processor while performing applications.

13. A processor comprising:
a plurality of registers to store data;
an instruction decoder to decode a first instruction word that is to include a first plurality of instructions:
the first instruction word to have a first bit sequence;
a plurality of values of the first bit sequence each to provide an address of a register to have an operand on which an operation of the first instruction word is to be performed; and
a given value of the first bit sequence to direct the instruction decoder to take a value in a field of the first instruction word that is different than the first bit sequence, wherein the field has a greater number of bits than the first bit sequence; and
a plurality of groups of execution units coupled with the instruction decoder and the plurality of registers.

14. The processor of claim 13, wherein the first instruction word is to have at least three instructions.

15. The processor of claim 13, wherein the first bit sequence comprises four bits.

16. The processor of claim 13, wherein the first instruction word is included in a set of instructions that include instruction words that have varying instruction lengths.

17. The processor of claim 13, wherein only one execution unit in each of the groups of execution units is to be controlled by a different corresponding instruction of the first instruction word.

18. A processor comprising:
a plurality of registers to store data;
a first group of execution units;
a second group of execution units;
a third group of execution units;
an instruction decoder coupled with the first, second, and third groups of execution units and the plurality of registers, the instruction decoder to decode instruction words including,
a first instruction word having a first plurality of at least three instructions, and
a second instruction word having a second plurality of instructions, wherein the second plurality of instructions is less than the first plurality of the at least three instructions,
wherein each of the first, second, and third groups of execution units is to correspond to a different instruction of the at least three instructions of the first instruction word,
wherein only one execution unit in each of the first, second, and third groups of execution units is to be controlled by the different corresponding instruction of the at least three instructions of the first instruction word,
wherein only one execution unit in less than all of the first, second, and third groups of the execution units is to be controlled by a different corresponding instruction of the second instruction word, and
wherein the second instruction word is to have a shorter instruction length than the first instruction word.

\* \* \* \* \*